July 29, 1952 W. T. DOWNING ET AL Re. 23,527

ROTARY PLUG VALVE

Original Filed June 11, 1946

INVENTORS
WILLIS T. DOWNING
SIDNEY P. JOHNSON

BY George Sipkin
B. L. Tanguill
ATTORNEY

Reissued July 29, 1952

Re. 23,527

UNITED STATES PATENT OFFICE 23,527

ROTARY PLUG VALVE

Willis T. Downing, Alexandria, Va., and Sidney P. Johnson, Washington, D. C.

Original No. 2,464,123, dated March 8, 1949, Serial No. 676,046, June 11, 1946. Application for reissue September 21, 1949, Serial No. 116,881

13 Claims. (Cl. 251—97)

(Granted under the act of March 3, 1883, as amended April 30, 1928; 370 O. G. 757)

Matter enclosed in heavy brackets [ ] appears in the original patent but forms no part of this reissue specification; matter printed in italics indicates the additions made by reissue.

This invention relates to a rotary plug valve which is axially movable; and in particular to a rotary plug valve which does not rotate with respect to the valve seat when in seated position.

Axially movable rotary plug valves are known in the art in which the plug is adapted to be lifted from its seating contact before rotation to open position. These valves are generally provided with two operating hand wheels which separately function to lift the plug and to rotate it. Or they may be of other design involving a complicated system of levers, guides and spring-actuated stops which make the valve defective in operation. In most cases present art valves of this type operate in the open position with the rotary plug in unseated position. This is a defect which permits the fluid being controlled to pass around the plug and in some cases to be in contact with the packing in the valve stem packing gland. Such construction has a deleterious effect on the valve seat and also the packing and valve stem.

With these defects in view it is, therefore, an object of this invention to provide an improved valve of the rotary axially movable plug type which is adapted to be lifted from contact with its seat before either opening or closing the valve.

It is also an object of this invention to provide a valve of the rotary axially movable plug type which cannot be rotated when the plug is in contact with its valve seat.

It is a further object of this invention to provide a valve of the rotary, axially movable plug type which is adapted to be operated by a single hand wheel.

It is an additional object of this invention to provide a valve of the rotary, axially movable plug type, which by reason of the fact that the plug is seated when in either open or closed position, is adapted for service in salt water, gasoline or high pressure steam lines, and It is a still further object of this invention to provide a valve of the rotary, axially movable plug type which is of simple, sturdy construction and capable of economical manufacture.

Figure 1:
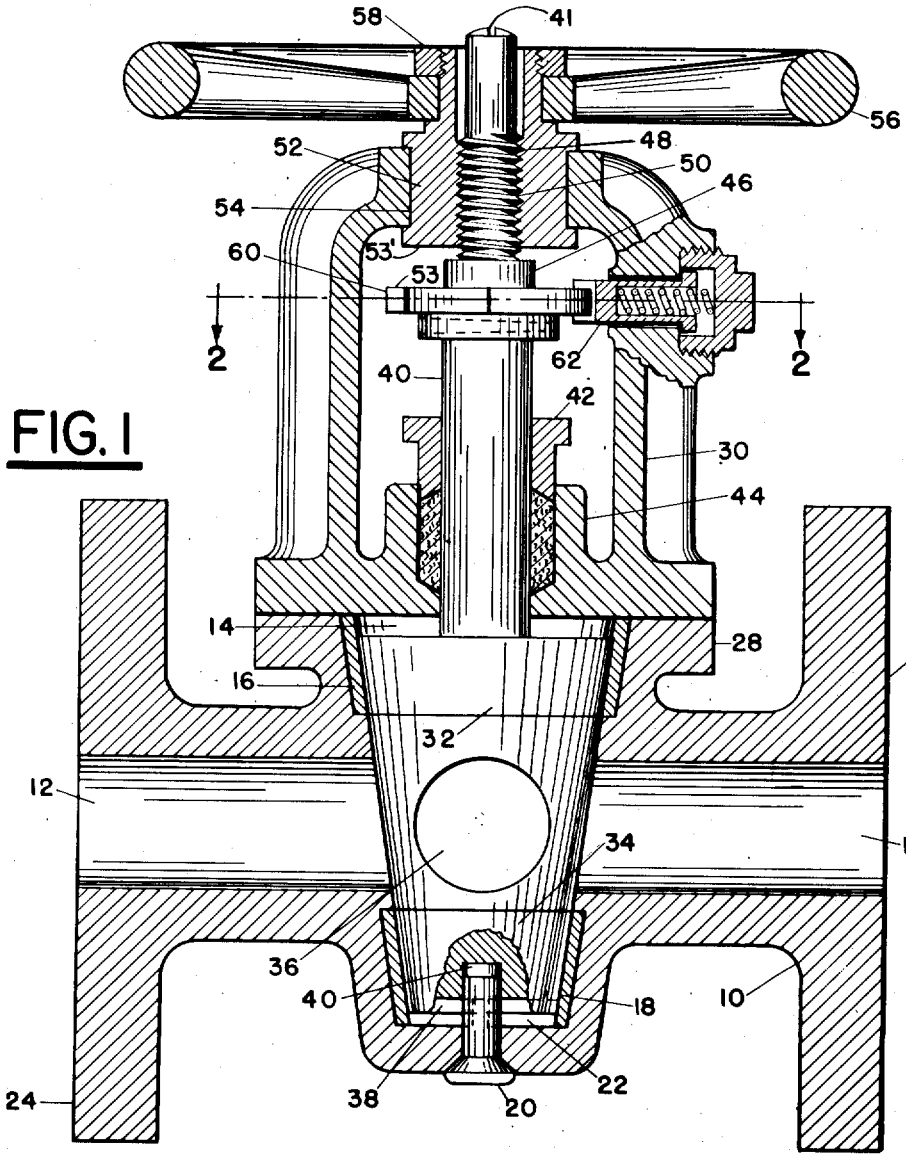
Figure 2:
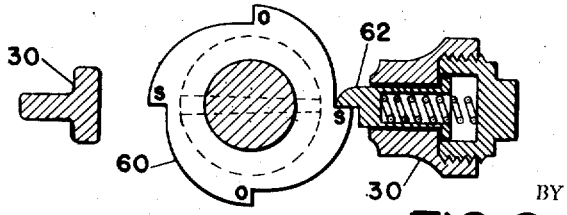

In order that a clear conception may be had of the construction by which these objectives are attained, reference is now made to the drawings which are illustrative of a preferred embodiment of the invention and in which Figure 1 is a longitudinal vertical section taken on the median plane through the valve assembly showing the relationship of the valve parts to each other, and Figure 2 is a partial sectional view taken on line 2—2 of Figure 1 looking in the direction indicated by the arrows. It shows the relationship of the rotation limiting and indexing cam to the spring actuated pawl.

In the drawings 10 represents a valve body which is provided with passageway 12 extending therethrough for the conduction of fluid. Body 10 is provided with a frusto-conically shaped cavity 14 which is positioned centrally of the body on the median axis at right angles to the center line of passage 12. Cavity 14 is provided with valve seats 16 and 18. The bottom of valve body 10 is provided with a countersunk pin 20 which is centered on the above median axis and projects into cavity 14. The interior face of the bottom of body 10 is provided with transverse ribs 22 which are positioned at right angles to each other and with one rib parallel with passageway 12. Valve body 10 is provided with conventional flanges 24 and 26 which are adapted to be connected to pipe lines in the usual manner. Body 10 is also provided with flange 28 which is adapted to support yoke 30. Rotary plug 32 is frusto-conical in shape. It is adapted to fit within cavity 14 and is provided with seats 32 and 34 to contact valve seats 16 and 18 respectively. Plug 32 is provided with a transverse passageway 36 which matches with passageway 12 when in open seated position. Plug 32 is provided with transverse *guide* slots 38 and an opening 20' in its bottom which are adapted to interfit with transverse *guide* ribs 22 and pin 20 respectively. Valve stem *40* [20'] extends from the larger end of plug 32 through packing gland 42 which is adapted to engage boss 44 in the base of yoke 30. Stem 40 is of uniform diameter to shoulder 46 where its diameter is reduced and is provided with right hand threads as at 48 which are adapted to match threads 50 in bushing 52. *The shoulder 46 has an upper jam surface 53, and the bushing 52 has an annular lower jam surface 53'.* The end of stem 40 is provided with a slot 41 which is positioned in parallel with passageway 36. This slot thus readily indicates the position of passageway 36.

Bushing 52 is journaled in the arms of yoke 30 as at 54 and is free to rotate with respect thereto. Bushing 52 extends through the hub of handwheel 56 and is firmly attached thereto by means of locknut 58 which threadedly engages the extension of bushing 52 and clamps the hub of handwheel 56 between a shoulder on the bushing and itself. The large portion of stem 40, *below the upper jam surface 53,* is provided with a four tooth indexing cam 60 which is adapted to engage spring biased pawl 62 which is mounted in an arm of yoke 30. These teeth are indexed with the letter O or S to indicate the "open" or "shut" position of the valve. When a tooth of the cam is engaged by pawl 62 rotation of the stem and valve plug in a counterclockwise direction is prevented.

In operation the valve is manipulated as follows: Assuming the valve to be closed and in seated position, hand-wheel 56 is rotated in a clockwise direction. Plug 32 and stem 40 are prevented from rotation by transverse ribs 22 in the bottom of valve body 10 with which the plug is engaged. Bushing 52 rotates with hand-wheel 56 and since its threads which engage stem 40 are right-handed, clockwise rotation of the hand-wheel lifts or "jacks" the valve plug from its seat, *the valve plug moving axially of the stem, that is, in a general direction paralleling the axis of the stem 40 and bushing 52.* At the time at which the valve plug clears ribs 22, *the jam surface 53 of* shoulder 46 on valve stem 40 jams on the under surface *53'* of bushing 52 and valve plug 32 and hand-wheel 56 then rotate as a unit. Hand-wheel 56 is then rotated through an angle of 90° or until pawl 62 drops over the edge of the tooth marked "O" on cam 60. At this point passageway 36 is in alignment with passageway 12. Valve plug 32 is then seated by rotating hand-wheel 56 in a counterclockwise direction until ribs 22 engage slots 38 and the seats on the plug and valve body are in contact with each other. To close the valve the above operations are repeated. First the plug is "jacked" from its seat by a clockwise rotation of the hand-wheel. The valve is then rotated in a clockwise direction until pawl 62 drops over the tooth on cam 60 marked "S" and the hand wheel is then rotated in counter-clockwise direction until the plug is seated.

It is apparent that these inventors have provided a rotary plug valve which never rotates when in seated position, a fact which prevents rapid erosion of the valve seats. Also by reason of the fact that the rotary plug is seated when in open and closed positions the valve can be used in high pressure steam service, on salt water lines, on gasoline lines, i. e. on high duty service.

While the preferred embodiment of the invention is that shown by the drawings, it is not desired to be strictly limited thereto as modifications in the various parts and their relative locations can be made without departing from the spirit or scope of the invention as defined by the herewith appended claims.

The invention described herein may be manufactured and used by or for the Government of the United States of America for governmental purposes without the payment of any royalties thereon or therefor.

We claim:

1. A valve of the rotary, axially movable plug type comprising a valve body having a passageway extending therethrough [, a rotary plug adapted to be seated and unseated in the valve body when moved axially, a valve seat extending transversely of the body, said valve seat being of greater length than the plug to allow axial movement of the plug,] *and having a plug-receiving cavity intersecting said passageway, a rotary plug adapted to be seated and unseated in the cavity in the valve body when moved axially, said cavity being of greater length than the plug to allow axial movement of the plug, the wall of said cavity forming a valve seat,* said plug in its seated position being in contact with the seat, said plug having a transverse passageway adapted to align with the passageway through said body, a frame mounted on said valve body, actuating means including a bushing rotatably mounted in said frame, a valve stem extending from said plug and having a threaded connection with said bushing so that rotation of said bushing relative to said stem effects axial movement of said stem to seat and unseat said plug, means carried by said stem and engageable with said bushing for coupling said stem and bushing for rotation together when said plug is unseated so that rotation of said bushing effects rotation of said plug, and means carried by said frame for opposing rotary movement of said stem in a direction opposite to the direction of rotation of said bushing to rotate the plug whereby when said bushing is rotated in the said opposite direction the plug is moved axially to reseated position, *and means for preventing rotation of the plug when the latter is in seated position and substantially until said bushing engageable means carried by the stem is in engagement with the bushing.*

[2. A valve as called for in claim 1 having means for preventing rotation of the plug when the latter is in seated position and substantially until said bushing engageable means carried by the stem is in engagement with the bushing.]

*3. A valve of the rotary, axially movable plug type comprising a valve body having a passageway extending therethrough and having a plug-receiving cavity intersecting said passageway, a rotary plug adapted to be seated and unseated in the cavity in the valve body when moved axially, said cavity being of greater length than the plug to allow axial movement of the plug, the wall of said cavity forming a valve seat, said plug in its seated position being in contact with the seat, said plug having a transverse passageway adapted to align with the passageway through said body, a frame mounted on said valve body, actuating means including a bushing rotatably mounted in said frame, a valve stem extending from said plug and having a threaded connection with said bushing so that rotation of said bushing relative to said stem effects axial movement of said stem to seat and unseat said plug, means carried by said stem and engageable with said bushing for coupling said stem and bushing for rotation together when said plug is unseated so that rotation of said bushing effects rotation of said plug, an indexing cam rigidly fixed to said stem, and a biased pawl carried by said frame and cooperating with said cam to oppose rotary movement of said stem only in a direction opposite to the direction of rotation of said bushing to rotate the plug whereby when said bushing is rotated in the said opposite direction the plug is moved axially to reseated position, said pawl and said cam being of thicknesses in a direction axially of said stem to maintain them in cooperative relation as said stem moves into and from said coupling engagement with said bushing.*

*4. A valve of the rotary, axially movable plug type comprising a valve body having a passageway extending therethrough and having a plug-receiving cavity intersecting said passageway, a rotary plug adapted to be seated and unseated in the cavity in the valve body when moved axially, said cavity being of greater length than the plug to allow axial movement of the plug, the* wall of said cavity forming a valve seat, said plug in its seated position being in contact with the seat, said plug having a transverse passageway adapted to align with the passageway through said body, a frame mounted on said valve body, actuating means including a bushing provided with a jam surface, said actuating means being rotatably mounted in said frame, said bushing having a threaded bore therethrough, a valve stem extending from said plug and having a threaded connection with the bore through said bushing so that rotation of said bushing relative to said stem effects axial movement of said stem to seat and unseat said plug, jam means carried by said stem and engageable with said jam surface for coupling said stem and bushing for rotation together in a predetermined direction when said plug is unseated so that rotation of said bushing in said predetermined direction effects rotation of said plug, guide means operative when said bushing is rotated for preventing rotation of said plug when said plug is in seated position and substantially until said jam means is in engagement with said jam surface, said guide means being inoperative for preventing rotation of said plug after said engagement, cooperative means comprising an indexing cam member and a biased pawl member permitting rotation of said stem in said predetermined direction but preventing rotation of said stem in a direction opposite to said predetermined direction when said stem is in any one of a plurality of predetermined angular positions thereof, a first of said members being rigidly fixed to said stem and the second of said members being in a fixed position on said frame, said members being of thicknesses axially of said stem to maintain them in cooperative relation as said stem moves axially in a direction to seat said plug and until said guide means becomes operative.

5. A valve of the rotary, axially movable plug type comprising a valve body having a passageway extending therethrough and having a tapered plug-receiving cavity intersecting said passageway, a tapered rotary plug adapted to be seated and unseated in the cavity in the valve body when moved axially, said cavity being of greater length than the plug to allow axial movement of the plug, the wall of said cavity forming a valve seat, said plug in its seated position being in contact with the seat, said plug having a transverse passageway adapted to align with the passageway through said body, a frame mounted on said valve body, actuating means including a bushing rotatably mounted in said frame, a valve stem extending from said plug and having a threaded connection with said bushing so that rotation of said bushing relative to said stem effects axial movement of said stem to seat and unseat said plug, means carried by said stem and engageable with said bushing for coupling said stem and bushing for rotation together when said plug is unseated so that rotation of said bushing effects rotation of said plug, pawl and cam means below the last said means, comprising an indexing cam rigidly fixed to said stem, and an adjustable spring biased pawl inserted through an aperture in said frame and cooperating with said cam to oppose rotary movement of said stem only in a direction opposite to the direction of rotation of said bushing to rotate the plug whereby when said bushing is rotated in the said opposite direction the plug is moved axially to reseated position, said pawl and cam being of sufficient thicknesses to maintain them cooperative during axial movement of said stem.

6. A valve as defined in claim 4 but further characterized by said guide means comprising a rib member and a rib-receiving guide member in the bottom of said cavity.

7. A valve as defined in claim 4 but further characterized by said stem passing through said bore of said bushing and through an opening in said frame to provide a plug-position-indicating end, and an indicating mark at said end for indicating each of said predetermined angular positions.

8. A valve of the rotary, axially movable plug type comprising casing means comprising a valve body having a passageway extending therethrough and having a plug-receiving cavity intersecting said passageway, a closure member comprising a rotary plug adapted to be seated and unseated in the valve body when moved axially, said cavity being of greater length than the plug to allow axial movement of the plug, the wall of said cavity forming a valve seat, said plug in its seated position being in contact with the seat, said plug having a transverse passageway adapted to align with the passageway through said body, said casing means comprising a frame mounted on said valve body and having an opening, actuating means including a bushing rotatably mounted in said frame-opening for rotation only, said bushing having a threaded bore therethrough, said closure member comprising a valve stem having a threaded connection with the bore through said bushing, confining means holding said closure member against rotation with respect to said casing means so that rotation of said bushing relative to said stem in a selected direction initially effects translatory axial movement of said stem said plug, said confining means comprising a rib portion and a rib-guiding guide portion, a first of said portions being on said casing means and the second portion on said closure member, said portions being slidably cooperative axially of said stem for a limited length of said axial movement of said stem and plug and then becoming operatively disengaged thereafter, said closure member and said actuating means having jam surfaces that engage after said stem and plug have moved at least said limited length for coupling said stem and bushing for rotation together so as to effect rotation of said plug in said selected direction, and cooperative means carried by said frame and said stem for opposing rotary movement of said stem only in a direction opposite to said selected direction when said bushing is rotated in said opposite direction, whereby when said bushing is rotated in said opposite direction the plug is moved axially towards reseated position, said cooperative means comprising an indexing cam member rigidly secured to said stem below said jam surfaces, and a pawl member in a predetermined position on said frame.

9. A valve of the rotary, axially movable plug type comprising casing means comprising a valve body having a passageway extending therethrough and having a plug-receiving cavity intersecting said passageway, a closure member comprising a stem and a rotary plug adapted to be seated and unseated in the valve body when moved axially, said cavity being of greater length than the plug to allow axial movement of the plug, the wall of said cavity forming a valve seat.

*said plug in its seated position being in contact with the seat, said plug having a transverse passageway adapted to align with the passageway through said body, a gland seal for said stem and valve body, said casing means comprising a frame mounted on said valve body and having an opening, actuating means rotatably mounted in said frame-opening for rotation only, said actuating means having a threaded bore, said stem having a threaded connection with said bore, means holding said closure member against rotation with respect to said casing means so that rotation of said actuating means relative to said stem in a selected direction initially effects axial movement of said stem and said plug from seated position, the last said means being effective for a limited axial length of movement of said stem, said closure member and said actuating means having jam surfaces that engage when said stem and plug have moved at least said limited axial length so as to effect rotation of said plug in said selected direction, and cooperative means carried by said frame and said stem for opposing rotary movement of said stem in a direction opposite to said selected direction when said actuating means is rotated in said opposite direction, whereby plug is moved axially towards reseated position, said cooperative means comprising an indexing cam member and a pawl member, a first of the last said members being rigidly secured to said stem below said jam surfaces, and the other member being secured in a predetermined position to said frame.*

*10. A valve as defined in claim 9 but further characterized by means providing for adjustably positioning the last said members relative to each other.*

*11. A valve of the rotary, axially movable plug type comprising casing means comprising a valve body having a passageway extending therethrough and having a plug-receiving cavity intersecting said passageway, a closure member comprising a stem and a rotary plug adapted to be seated and unseated in the valve body when moved axially, said cavity being of greater length than the plug to allow axial movement of the plug, the wall of said cavity forming a valve seat, said plug in its seated position being in contact with the seat, said plug having a transverse passageway adapted to align with the passageway through said body, a gland seal for said stem and valve body, rotatable actuating means associated with said casing means, and interconnecting means between said actuating means and closure member, said actuating means and interconnecting means being co-operable when said actuating means is rotated first to axially move said plug and stem from seated position, then to rotate said plug and stem, and then to axially move said plug and stem back to seated position, said interconnecting means comprising cooperative members carried by said casing means and said stem spaced from said gland seal, said cooperative members comprising an indexing cam member and a pawl member, a first of the last said members being rigidly secured to said stem above said gland seal, and the other member being secured in a predetermined position with respect to said casing means.*

*12. A valve as defined in claim 11 but further characterized by said pawl and cam members being of thicknesses in a direction axially of said stem so as to maintain them in cooperative relation whenever said actuating means and interconnecting means are co-operable in a manner to rotate said plug and stem.*

*13. A valve of the rotary axially movable plug type comprising casing means comprising a valve body having a passageway extending therethrough and having a plug-receiving cavity intersecting said passageway, a closure member comprising a stem and a rotary plug adapted to be seated and unseated in the valve body when moved axially, a wall of said cavity comprising a valve seat, said cavity being of greater length than said plug to allow axial movement of said plug, said plug in seated position being in contact with said valve seat, said plug having a transverse passageway adapted to align with the passageway through said valve body, said casing means comprising a frame on said valve body, rotatable actuating means carried by said frame, said actuating means comprising means having a threaded bore, said stem having a threaded connection with said bore, said actuating means having a jam surface, jam means carried by said closure member spaced from said jam surface when said plug is seated, means for preventing rotation of said closure member with respect to said valve body during rotation of said actuating means in a selected direction and causing said stem to move axially until said jam surface and jam means engage, whereupon said actuating means can rotate said closure member thereafter, and cooperative means carried by said frame and said closure member for opposing rotary movement of said closure member in a direction opposite to said selected direction when said actuating means is rotated in said opposite direction, whereby said plug can be moved axially toward reseated position, said cooperating means comprising an indexing cam member and a pawl member, a first of the last said members being fixedly secured to said closure member and the other of said members being secured in a predetermined position to said frame.*

*14. A valve as defined in claim 13 wherein said plug and said cavity are also tapered.*

WILLIS T. DOWNING.
SIDNEY P. JOHNSON.

REFERENCES CITED

The following references are of record in the file of this patent:

UNITED STATES PATENTS

| Number | Name | Date |
|---|---|---|
| 511,510 | Coale | Dec. 26, 1893 |
| 622,875 | Woerner | Apr. 11, 1899 |
| 2,139,632 | Flodin | Dec. 6, 1938 |
| 2,238,385 | Foster | Apr. 15, 1941 |

FOREIGN PATENTS

| Number | Country | Date |
|---|---|---|
| 616,289 | France | of 1926 |